US012626276B2

(12) United States Patent
Price et al.

(10) Patent No.: US 12,626,276 B2
(45) Date of Patent: May 12, 2026

(54) MOBILE DEVICE SYSTEM WITH LOCATION MODULE

(71) Applicant: CALSYS HOLDINGS, LLC, Penn Valley, CA (US)

(72) Inventors: Lucinda Grace Price, Penn Valley, CA (US); Edmond DeFrank, Northridge, CA (US)

(73) Assignee: CALSYS Holdings, LLC, NV (US)

( * ) Notice: Subject to any disclaimer, the term of this patent is extended or adjusted under 35 U.S.C. 154(b) by 12 days.

(21) Appl. No.: 17/525,859

(22) Filed: Nov. 12, 2021

(65) Prior Publication Data

US 2022/0180398 A1    Jun. 9, 2022
US 2024/0354804 A9    Oct. 24, 2024

Related U.S. Application Data

(63) Continuation of application No. 15/485,527, filed on Apr. 12, 2017, now abandoned, which is a (Continued)

(51) Int. Cl.
G06Q 30/0251    (2023.01)
G06Q 10/109    (2023.01)
G06Q 10/1093    (2023.01)

(52) U.S. Cl.
CPC ....... G06Q 30/0252 (2013.01); G06Q 10/109 (2013.01); G06Q 10/1093 (2013.01); (Continued)

(58) Field of Classification Search
None
See application file for complete search history.

(56) References Cited

U.S. PATENT DOCUMENTS 6,369,840 B1 *    4/2002    Barnett .............. G06Q 10/1093
                                                          715/962
7,072,849 B1    7/2006    Filepp et al.
(Continued)

FOREIGN PATENT DOCUMENTS

WO    WO2001037595 A    5/2001
WO    WO2002008854 A    1/2002
WO    WO2009010633 A1    1/2009

OTHER PUBLICATIONS

Bernhard Kolmel and Spiros Alexakis; Location-Based Advertising; M-Business 2002, The First International Congress on Mobile Business; Date Unknown, Publisher: e-lba.com. https://web.archive.org/web/20021210174450fw_/http://www.e-lba.com/index5.html.

*Primary Examiner* — Christopher J Fibbi
(74) *Attorney, Agent, or Firm* — Lucinda Price

(57)    ABSTRACT

A mobile device system comprises a database module, a location module (e.g., a pre-filter module), a learning module, a filter module, and a notification module. The database module is coupled with a network, including a mobile phone network. The location module is configured to dynamically update a current location of the mobile device in the mobile phone network. The learning module is configured to determine one or more certain content types associated with content configured to be displayed on the mobile device. The filter module is configured to dynamically filter the content configured to be displayed based on a plurality of categories. The notification module is coupled with the mobile phone network and configured to dynamically display updated content on the mobile device, wherein the updated content comprises the dynamically filtered content.

10 Claims, 10 Drawing Sheets

Related U.S. Application Data continuation of application No. 12/080,652, filed on Apr. 2, 2008, now Pat. No. 9,646,288.

(60) Provisional application No. 60/922,992, filed on Apr. 11, 2007, provisional application No. 60/921,998, filed on Apr. 4, 2007.

(52) U.S. Cl.
CPC ..... *G06Q 30/0251* (2013.01); *G06Q 30/0261* (2013.01); *G06Q 30/0267* (2013.01)

(56) References Cited

U.S. PATENT DOCUMENTS

| | | | |
|---|---|---|---|
| 7,076,443 B1 | 7/2006 | Emens et al. | |
| 7,289,793 B2 | 10/2007 | Gilbert | |
| 7,340,691 B2 | 3/2008 | Bassett et al. | |
| 7,729,689 B2 | 6/2010 | Chakraborty et al. | |
| 7,848,765 B2 | 12/2010 | Phillips et al. | |
| 7,873,708 B2 | 1/2011 | Durand et al. | |
| 7,945,204 B1 | 5/2011 | Johnson et al. | |
| 8,571,580 B2 | 10/2013 | Altman et al. | |
| 8,620,735 B2 | 12/2013 | Khoo | |
| 9,058,595 B2 | 6/2015 | Coffman et al. | |
| 9,386,356 B2 | 7/2016 | Harrison | |
| 9,965,920 B2 | 5/2018 | Joao | |
| 10,380,202 B2 | 8/2019 | Weisner et al. | |
| 2002/0032609 A1 | 3/2002 | Wilkman | |
| 2002/0161756 A1* | 10/2002 | Fesq ....................... | G06F 16/29 |
| 2003/0045301 A1* | 3/2003 | Wollrab ............... | G06Q 10/109 |
| | | | 455/457 |
| 2003/0061211 A1 | 3/2003 | Shultz | |
| 2004/0141005 A1 | 7/2004 | Banatwala et al. | |
| 2005/0086112 A1* | 4/2005 | Shkedi ................... | G06Q 30/02 |
| | | | 705/14.64 |
| 2005/0131762 A1* | 6/2005 | Bharat ................... | G06Q 30/02 |
| | | | 705/14.66 |
| 2005/0221843 A1 | 10/2005 | Friedman et al. | |
| 2005/0245241 A1 | 11/2005 | Durand et al. | |
| 2006/0135156 A1 | 6/2006 | Malu et al. | |
| 2006/0136297 A1 | 6/2006 | Willis | |
| 2006/0229941 A1 | 10/2006 | Gupta | |
| 2006/0270421 A1* | 11/2006 | Phillips .............. | G08B 21/0272 |
| | | | 455/457 |
| 2006/0282272 A1* | 12/2006 | Urasaki ............... | G06Q 10/109 |
| | | | 705/1.1 |
| 2006/0293065 A1* | 12/2006 | Chew ...................... | H04W 4/02 |
| | | | 455/456.3 |
| 2007/0146200 A1 | 6/2007 | Norin et al. | |
| 2007/0146812 A1* | 6/2007 | Lawton .................. | G06Q 30/02 |
| | | | 358/452 |
| 2007/0233736 A1 | 10/2007 | Xiong et al. | |
| 2007/0255831 A1* | 11/2007 | Hayashi ................ | G06Q 10/10 |
| | | | 707/999.01 |
| 2008/0014966 A1 | 1/2008 | Chakraborty | |
| 2008/0021728 A1 | 1/2008 | Khoo | |
| 2008/0086368 A1* | 4/2008 | Bauman ................ | H04W 4/029 |
| | | | 705/7.34 |
| 2008/0133336 A1 | 6/2008 | Altman | |
| 2016/0092918 A1 | 3/2016 | Cha | |

* cited by examiner

130

CALENDAR APPLICATION(S)

134 — MARKETING MODULE    COMPARISON MODULE — 136

132

CALENDAR MODULE

150 — RSS CONVERSION MODULE    WEB SITE PARSER MODULE — 152

154 — DISPLAY MODULE    POSTING MODULE — 156

158 — PRE-FILTER MODULE    FILTER MODULE — 160

162 — CONFLICT RESOLUTION MODULE    FRAUD PREVENTION MODULE — 164

168 — 170

166 — SYNCHING MODULE    NOTIFICATION MODULE    CATEGORY SELECTION MODULE

500

Event for A, B, C

510 — Ad A    Ad B, C — 530

520 — Ad A, B    Ad A — 540

MOBILE DEVICE SYSTEM WITH LOCATION MODULE

This Patent Application is a Continuation and claims priority to United States Patent Application entitled: "CAL-ENDAR SYSTEM", U.S. Ser. No. 15/485,527 as filed on Apr. 12, 2017 filed by Lucinda Grace Price, the U.S. Patent Application being incorporated herein by reference. and claims priority to U.S. patent application Ser. No. 12/080,652 entitled: "ADVERTISEMENTS BASED ON TARGET MARKET", U.S. Ser. Number, filed Apr. 2, 2008, the U.S. Patent Application being incorporated herein by reference, and claims priority to U.S. Provisional Patent Application No. 60/922,992 filed Apr. 11, 2007, having the title "On-Line Community Calendar" and the inventor, Lucinda G. Price, the U.S. Patent Application being incorporated herein by reference, and claims priority to U.S. Provisional Patent Application No. 60/921,998 filed Apr. 4, 2007, having the title of "On-Line Community Calendar" and having the inventor, Lucinda G. Price, the U.S. Patent Application being incorporated herein by reference.

BACKGROUND

It is difficult at best to determine what events are taking places locally without searching through newspapers, banners, word of mouth, flyers, and multiple websites.

BRIEF DESCRIPTION OF THE DRAWINGS

Embodiments are illustrated by way of example and not limitation in the Figures of the accompanying drawings, in which like references indicate similar elements and in which.

DETAILED DESCRIPTION

Embodiments describe a method and a system to display a community calendar. A request to display at least one filtered event in a calendar display interface is received, wherein the at least one filtered event is filtered from a plurality of categories based on selected criteria, wherein a collection of events is selected from an event database based on the selected criteria, and each collection of events forms a specific subcalendar of a plurality of subcalendars. A request to display selected ones of the specific subcalendars in the calendar display interface is received.

In the following description, for purposes of explanation, numerous specific details are set forth in order to provide a thorough understanding of embodiments of the present disclosure. It may be evident, however, to one skilled in the art that embodiments may be practiced without these specific details.

In example embodiments, a computer system (e.g., a client machine, server machine, etc.) configured by an application may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Platform Architecture

Figure 1:
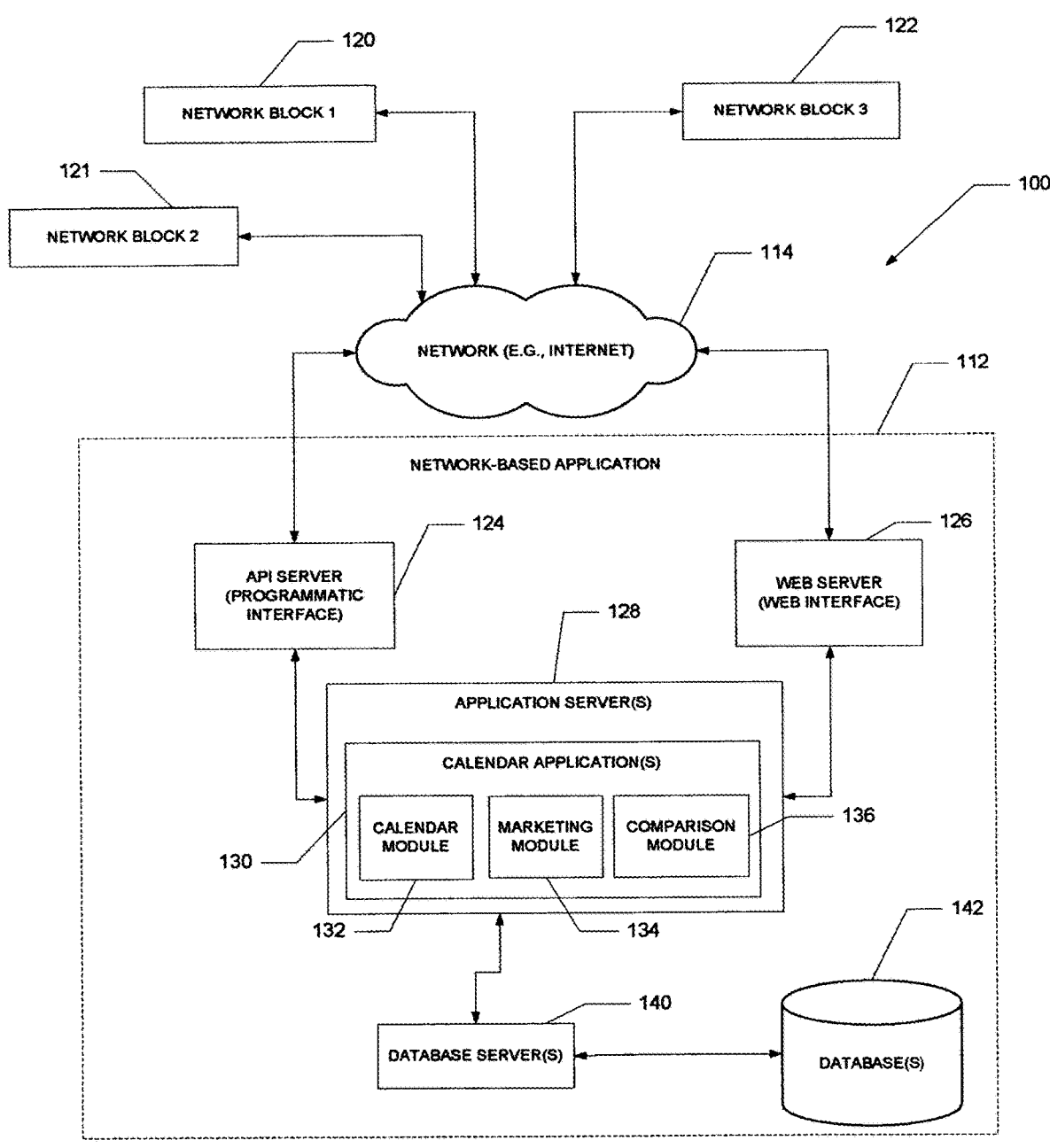
FIG. 1 illustrates a network diagram depicting a calendar system, according to an example embodiment.

FIG. 1 illustrates a network diagram depicting a system 100 having a client-server architecture, according to an example embodiment. A system, in the example form of a network-based system 112, provides server-side functionality, via a network 114 (e.g., the Internet, a public or private telephone network (wireline or wireless), a private wireless network using technologies such as Bluetooth or IEEE 802.11x or other networks) to one or more network blocks 120, 121, 122. In a client-server architecture, FIG. 1 illustrates, for example, a network block being a web client (e.g., a browser, such as the INTERNET EXPLORER® browser developed by MICROSOFT®) executing on client machine, e.g. on a network-based device. A device application or a programmatic client may also execute on the client machine. Embodiments are of course not limited to a client server architecture, and could equally well find applications in a distributed, or peer-to-peer, architecture system.

The network blocks, including network-based device(s) 120, 121, 122, may include a mobile device, a palmtop computer, a laptop computer, a desktop computer, a personal digital assistant, a cellular telephone, a communications device, a wireless telephone, a land-line telephone, a control system, a camera, a scanner, a television, television cable, a telephone with a web browser, a facsimile machine, a printer, a pager, and/or a personal trusted device. The device 120, 121, 122 may include a card, such as a smart card, a magnetic card, and/or a key card. The device may include a telephone or any device capable of Short Messaging Service (SMS) messaging, multimedia messaging service (MMS) messaging and/or generating audio tones, such as dual-tone multi-frequency (DTMF) tones. The device may be browser-enabled. The device may engage in an interactive message and/or open communication session, such as SMS, electronic mail, xHTML, Wireless Application Protocol (WAP), web, interactive voice response (IVR) and/or other mobile interfaces. The communication session between a client machine and the network-based system may involve multiple technology modalities, e.g. the client user may engage the system via SMS and receive a responsive communication as an SMS with an embedded hyperlinked URL directing the client user's device to a WAP or web page. A hyperlinked URL may be delivered directly to the device from the application server(s) 128 and may be used to access a web site or a microbrowser, such as a WAP site. The device 120, 121, 122 may enable mobile videophone communications, digital television signals, and/or digital radio signals. The device may include a receiver to receive near field communications.

At least one of the devices 120, 121 or 122 may be associated with an account holder. Turning specifically to the network-based system 112, an Application Program Interface (API) server 124, and a web server 126 may be coupled to, and may provide programmatic interfaces to one or more application servers 128. The devices may use one or more of these interfaces to access the application server(s) 128. For example, the web client may access the application server(s) 128 via the web interface supported by the web server 126. The web interface may include a web browser or any microbrowser, such as xHTML or WAP. Similarly, the programmatic client accesses the various services and functions provided by the application server(s) 128, via the programmatic interface provided by the API server 124 and/or the web server 126. In an additional embodiment, an application supported by one or more applications of the application server(s) may be downloadable to the network-based device. The device(s) may host the interface associated with the one or more applications of the application server(s) 128. The interface on the device may be an API interface, an SMS interface, a web interface, and/or an IVR interface. Consumer wireless device platforms, such as Java 2 Platform Micro Edition (J2ME), J2SE and J2EE allow developers to use Java and a wireless toolkit to create applications and programs for the device 122. The J2ME interface may include an application programming interface (API) for the device. The application of the programmatic client may also access the Internet using, for example, Binary Runtime Environment for Wireless (BREW).

The application server(s) 128 may host one or more calendar applications(s) 130. The calendar applications 130 may include a calendar management module (or calendar module) 132, a marketing module 134 and a comparison module (or compare module) 136. The application server(s) may have access to a database 142 through, for example, the database server(s) 140. The database may include event information or user account information.

The marketing module 134 may request display of a particular advertisement in the calendar display interface, wherein the particular advertisement is filtered from an advertisement database based on selection of a second collection from the plurality of categories, wherein in a first mode the second collection is included within the first collection and both the at least one filtered event and the particular advertisement are displayed in the calendar interface. The compare module 136 compares the first collection of the plurality of categories to the second collection of the plurality of categories.

The network 114 may include a mobile telephone network, a wireless wide area network (WWAN), a wireline telephone network, a wireless local area network (wireless LAN or WLAN), a wireless Metropolitan Area Network (MAN), and/or a wireless personal area network (PAN) (e.g., a Bluetooth® network). Other network-based technologies that may be used to connect include PON, VSAT satellite, Micro-impulse Radar, Radio Frequency identification (RFID), UltraWide Band, and/or Infrared. The network-based device may connect to the web using mobile internet exchange, e.g. Wireless Application Protocol (WAP) and/or Hypertext Transport Protocol (HTTP).
Application Server(s)

Figures 2, 5:
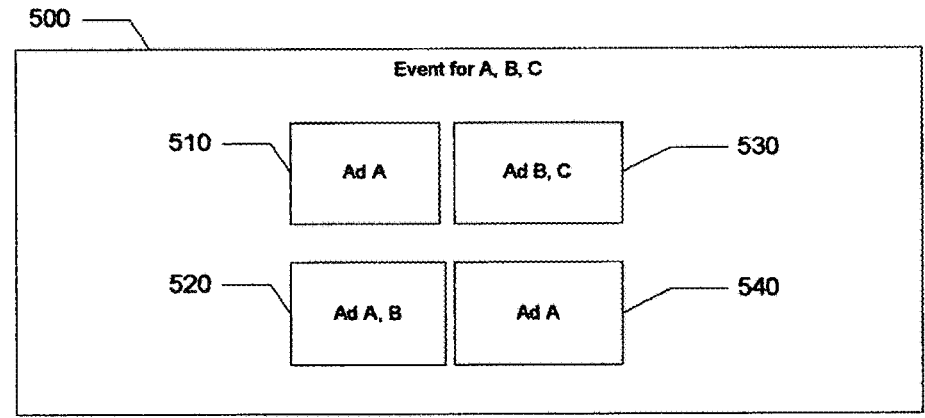
FIG. 2 illustrates a block diagram showing an application server in an example embodiment.
FIG. 5 illustrates a diagram of advertisements related to an event, according to an example embodiment.

FIG. 2 illustrates a block diagram showing application server(s) 128 that are part of the network-based system 112, in an example embodiment.

The calendar management module(s) 132 may be configured to set up, manage, and control the calendar(s). The calendar management module(s) 132 may include an RSS conversion module 150, a web site parser module 152, a display module 154, a posting module 156, a pre-filter module 158, a filter module 160, a conflict resolution module 162, a fraud prevention module 164, a synching module 166, a notification module 168, and a category selection module 170.

The calendar management module(s) 132 may include an RSS conversion module 150 to convert RSS feed information to event data to be displayed on a calendar display, as described herein. A web site parser module 152 may convert web site information into event data to be displayed. A display module 154 may include the management of the calendar display. A monthly, weekly, yearly, daily or another calendar type may be displayed. The calendar may display for example the current week, and the following 3 or 4 weeks for instance. After receiving the calendar display, the user may alter the display by searching or filtering through selected categories or turning on or off subcalendars in their personal subcalendar display page as described herein.

Figure 7:
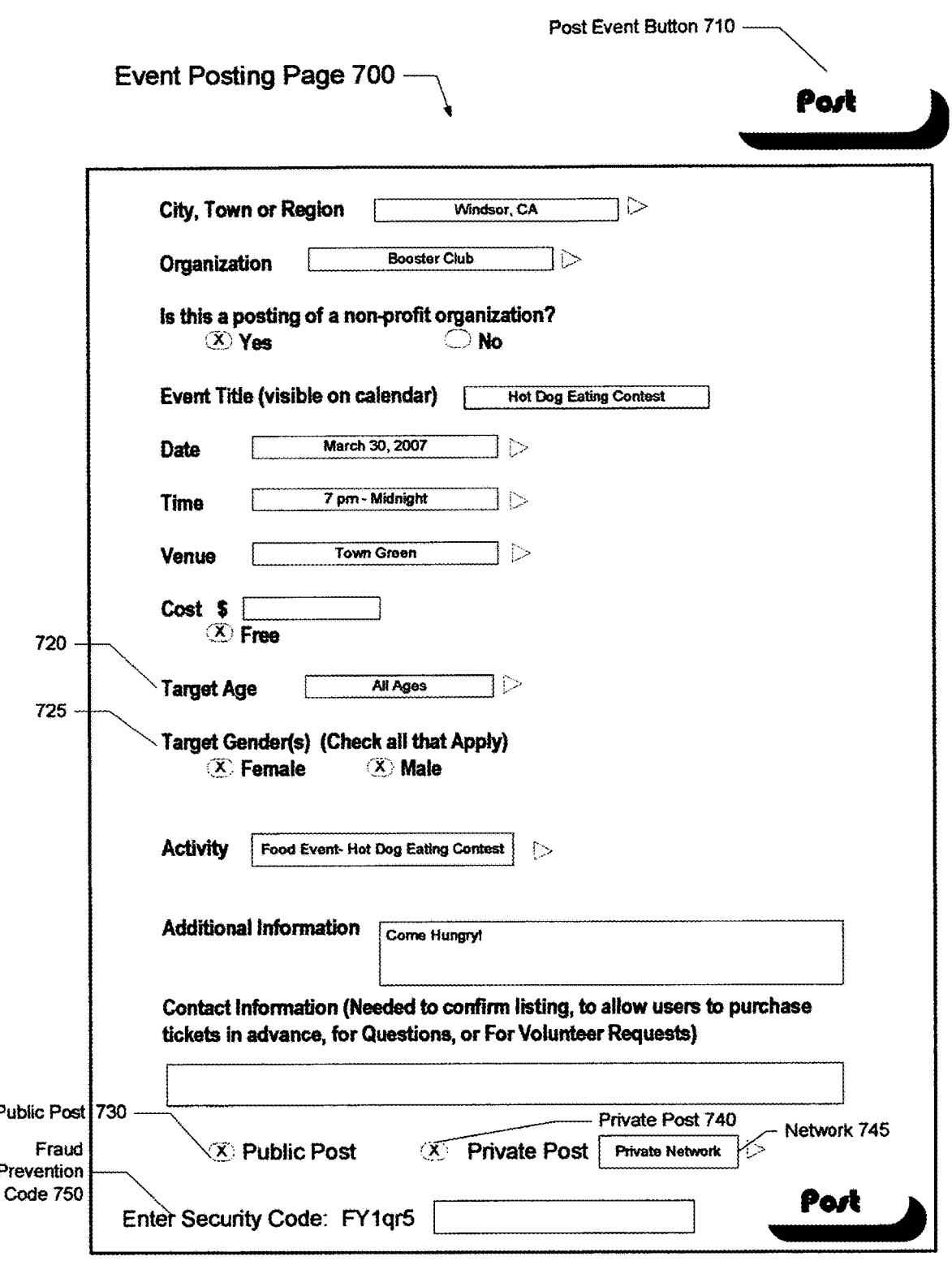
FIG. 7 illustrates a posting module page of the calendar system, according to an example embodiment.

A posting module 156 may include the management of event postings by users as described herein with respect to FIG. 7. After posting an event, the post may tell the user to check their email (and save it) to publish their post to the calendar. If there is no duplicate event, the system may send to the user (at their email address) a message with a link that they may click. The user may then click on the link, and see their event. They then have the option of: "posting" or "editing" or "deleting". The email is used to delete or edit the event at a later time. In addition, the email message may direct the user to post other events, go to their subcalendar page, or another location.

A pre-filter module 158 manages when a user visits the calendar system. If the system does not automatically recognize the user, the system searches for an IP address associated with the user. Data associated with the IP address is transmitted as events to a calendar display relevant to the user as described herein. If the system recognizes the user, the user-selected subcalendars display on the calendar display. The user may also submit a zip code to be recognized without logging in or registering with the system.

A filter module 160 may also be known as the category management module(s), which may be configured to manage the different categories through which a user may filter events. The user may alter the display by searching or filtering through selected categories. The filter module 160 requests display of at least one filtered event in a calendar display interface, wherein the at least one filtered event is filtered from a plurality of categories based on selected criteria, wherein a collection of events is selected from an event database based on the selected criteria, and each collection of events forms a specific subcalendar of a plurality of subcalendars. The category selection module 170 requests display of selected ones of the specific subcalendars in the calendar display interface and is discussed in more detail with regard to FIG. 8.

A conflict resolution module 162 manages potential duplicative events. The module may provide mechanisms whereby conflicts may be resolved. For example, the module may provide guided procedures whereby the parties are guided through a number of steps in an attempt to settle the conflict. In the event that the conflict may not be settled via the guided procedures, the conflict may be escalated to an administrator, for example. The system may search for potential duplicate events (for example, same venue at the same time may be the criteria for a potential duplicate event). The user adding the latest possibly conflicting event may have at least one of the following options: receive information about the other event at the same time/place, delete their own post as duplicative, edit their own posting, contact the original poster to update or remove their event, post their duplicative event regardless, hit the "remove" button for the original post to have that original post deleted as miscategorized, error, inappropriate or otherwise. Several 'removes' from different IP addresses, for instance, may be received before the original post is actually removed.

The user may be sent an email with information about the duplicate event and asked to confirm whether they need to edit their posting, or asked whether their event is indeed duplicative. In the instance where the user who is posting believes the first event is incorrect, the user may have an option to contact the one who posted the initial event. An email address may be given to the new poster that may route them through the system first (so they may not view the original poster's real address) to work out the conflict.

A fraud prevention module 164 may include analysis of posted events, which may be approved/disapproved automatically per a monitoring and approval(s) table or they may be approved/disapproved individually, for instance. The user posts an event using the event posting page. In an embodiment, the user fills out each of the blanks in order to post, including the security code and their email address. The system may automatically search the posting for any inappropriate content. If there is inappropriate content, the user may be sent a message with a warning against such postings and the event is not posted. If the same user makes another inappropriate post, their IP address and/or email address may be banned from further postings. If there is no inappropriate content, the system may search for potential duplicate events through module 162.

A synching module 166 synchronizes the calendar display and/or category selection module (selected subcalendars) with personal calendar applications such as Microsoft® Outlook® and iCal® of Apple, Inc.

A notification module 168 is responsible for the generation and delivery of messages to client users of the network-based system 112. Such messages, for example, advise users regarding the status of events. The messaging module(s) 168 may use SMS, IVR, email, or any other appropriate messaging module to transmit notification to the network-based device, for instance.

A customizing or personalization module(s) may allow a registrant to customize or personalize the account with various colors or themes, games, or other various customization tools.

Data Structures

Figure 3:
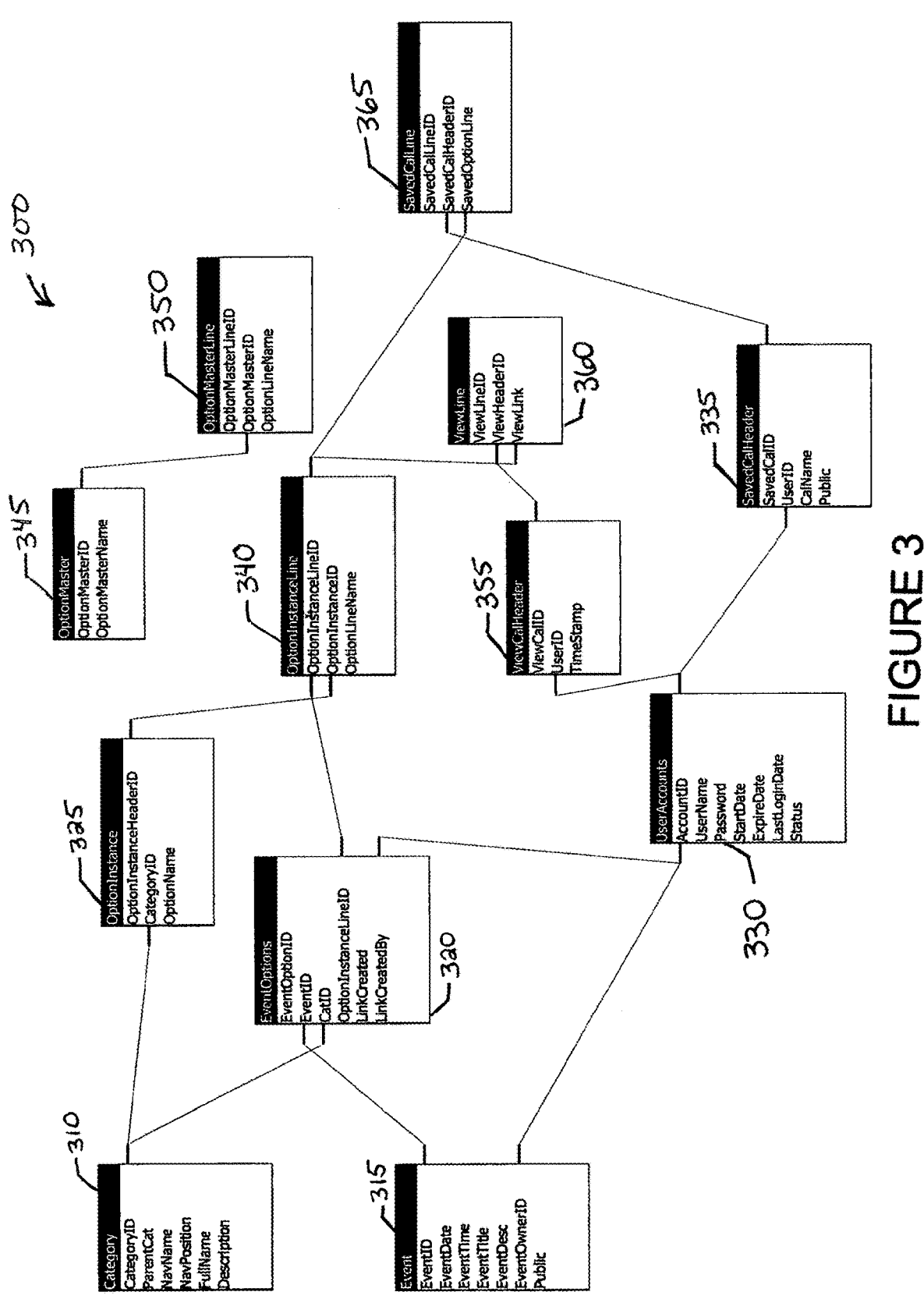
FIG. 3 illustrates a high-level entity-relationship diagram, illustrating various tables that may be maintained within one or more databases, according to an example embodiment.

FIG. 3 illustrates a high-level entity-relationship diagram, illustrating various tables 300 that may be maintained within the databases 142 according to an example embodiment. The tables 300 may be utilized by and support the module(s) of the application server(s).

The tables 300 may include a category table 310. The category table 310 may include a category ID (e.g., Earnings Report identification), the parent category Name (e.g., Finance), the Navigation Name (e.g., Earnings drop down), the Navigation position (e.g., $2^{nd}$ in drop down), Full name (Earnings Report) and a Description (e.g., Earnings Reports paragraph description).

The tables 300 may include an Event table 315, an event database. The event table 315 may include an eventide (e.g., unique id for a unique event), event date, event time, event title, event description, event owner ID (e.g., poster), and whether the event is public or private.

The tables 300 may include an EventOptions table 320 having eventoptionid, eventide, categoryid, optioninstance-lineid, linkcreated, and linkcreatedby. There may be two or more of these eventoptions tables 320 for a particular event (e.g., Event table 315).

The tables 300 may include an OptionInstance table 325 having an optioninstanceheaderid, a categoryid, and an optionname. The optioninstance table 325 may include subcategories, such as countries, or particular activities, for example.

The tables 300 may also include a useraccounts table 330. Each user account table 310 has an account ID, username, password, startdate, expiredate, lastlogin date, status (e.g., banned from posting). Each useraccount may have one or more saved subcalendars, as described herein.

A savedcalheader table 335 includes a savedcalheaderid, a userid (creator of subcalendar), calendar name, and whether the subcalendar is public.

An optioninstanceline table 340 includes an optioninstancelineid, an optioninstanceid, and an optionlinename.

The tables 300 may include an optionmaster table 345 feeding into the optioninstance table 325. The table 345 includes an optionmasterid, and an optionmastername. These optionmasternames are templates, common options or default choices, for example: country and countryid, as general categories.

The tables may include an optionmasterline table 350 having an optionmasterlineid (e.g., U.S. id), optionmasterid (e.g., countryid), and an optionlinename (e.g., U.S.). The table 350 is linked to table 345.

A viewcalheader table 355 includes a viewcalid, a userid, and a timestamp. Table 355 is linked to table 360. The viewline table 360 includes a viewlineid, viewheaderid, and a viewlink. A savedcalline table 365 includes a savedcalineid, savidcalheaderid, and a savedoptionline. These are the subcalendars and the savedcallineid is associated with optionsinstanceline.

A process of an embodiment includes a look up option master list. A list of all the option master entries (calendar events) has a create new button. If user clicks one of the items on the list, an edit option screen is presented, for instance. An options editor module presents the edit option screen or posting page. A category builder module allows an iCal parser module; calendar viewer module; and an RSS feeds module.

The system may include a Create/Edit Option Master for editing. The master may populate with the option line items in a list. User may be able to add/edit/delete items from the list. A new list may be the same but may start blank.

A look up category may be a list of top level categories. If user clicks on one it may drill down to the next level. This may continue until user get to a category with no sub-categories. It may indicate in some way if there are no further sub-categories and if any options have been assigned already. If no options have been assigned there may be the option to create further sub-categories.

If user click the button to add a sub-category to the existing level user have drilled down to it may prompt user for the name and add the sub-category to the list and go immediately to the edit category screen.

If user click to edit a category from the drill down process user may get an edit category screen. It may show the name and description fields as well as any options that have been assigned to the category. The screen may show each of the option list titles and items. User may have the option to edit any of the titles or options or add or remove option items. There may be a drop list of the master options (table 345). User may create a new option from this list or by typing in user own new option name. Once the new one is added user, may edit as described above.

A create event screen may allow the user to add information about an event such as title, time, place, description, etc. There may be a link to assign the event to a category. This is associated with event table 315.

An assign event to category page may function as a pop-up from the create event page and may provide some form of drill down menu for the user to select the appropriate category.

Once a category is selected the user may be prompted with the options that have been associated with that category. The user may then select all option choices that the event should be linked to. For each selection an EventOption record (table 320) may be created.

A look up users screen may be available from the administrative interface. There may be a list of user accounts (table 330). Clicking the column headings may cause the list to re-sort. Multiple entries may show on each page with standard page count navigation tool. When an individual record is clicked it may take user into the edit user screen.

A create/edit user account screen may have fields associated with user account that may be filled in here.

A view categories (nav) screen may be the navigation tool for the site. The top level navigation may be the Category records with ParentCat (parent category) set to 0. They may be listed in order of NavPosition (navigation position). If a category has other category records that list it as their ParentCat they may show as submenus beneath the parent. When a category is clicked that has no sub categories it may open the category option screen (or popup).

A pick category options screen may exist where after a category has been selected this screen may show the options that have been assigned to that category (option instance records). The user may check the boxes next to the options they want to filter the calendar for. When they are done they may have buttons to add the new selections to the currently displayed calendar or build a new one. They may also be able to add the selections to a new or existing saved calendar.

When a calendar filter has been selected by one of the above methods, A record may be created in the ViewCal-Header table with the current userid and timestamp. For each option setting that has been selected a record may be created in the ViewLine table.

A view 30 day calendar with selected filter screen may be created. The display calendar routine may show the calendar for the current date range displaying events that match the most recent record for the logged in user in the ViewCal-Header table. A view 7 day, 1 day, or selected event calendar with selected filter screen may also be created.

Some further details about the Display Calendar routine: The routine may be set up to accept iCal formatted data and display it in the proper configuration. The display routine may call a query routine that pulls events from the database and converts them to iCal or MS Outlook® format. This way the display routine may display imported data from any iCal® or Outlook® source.

Flowcharts

Figure 4:
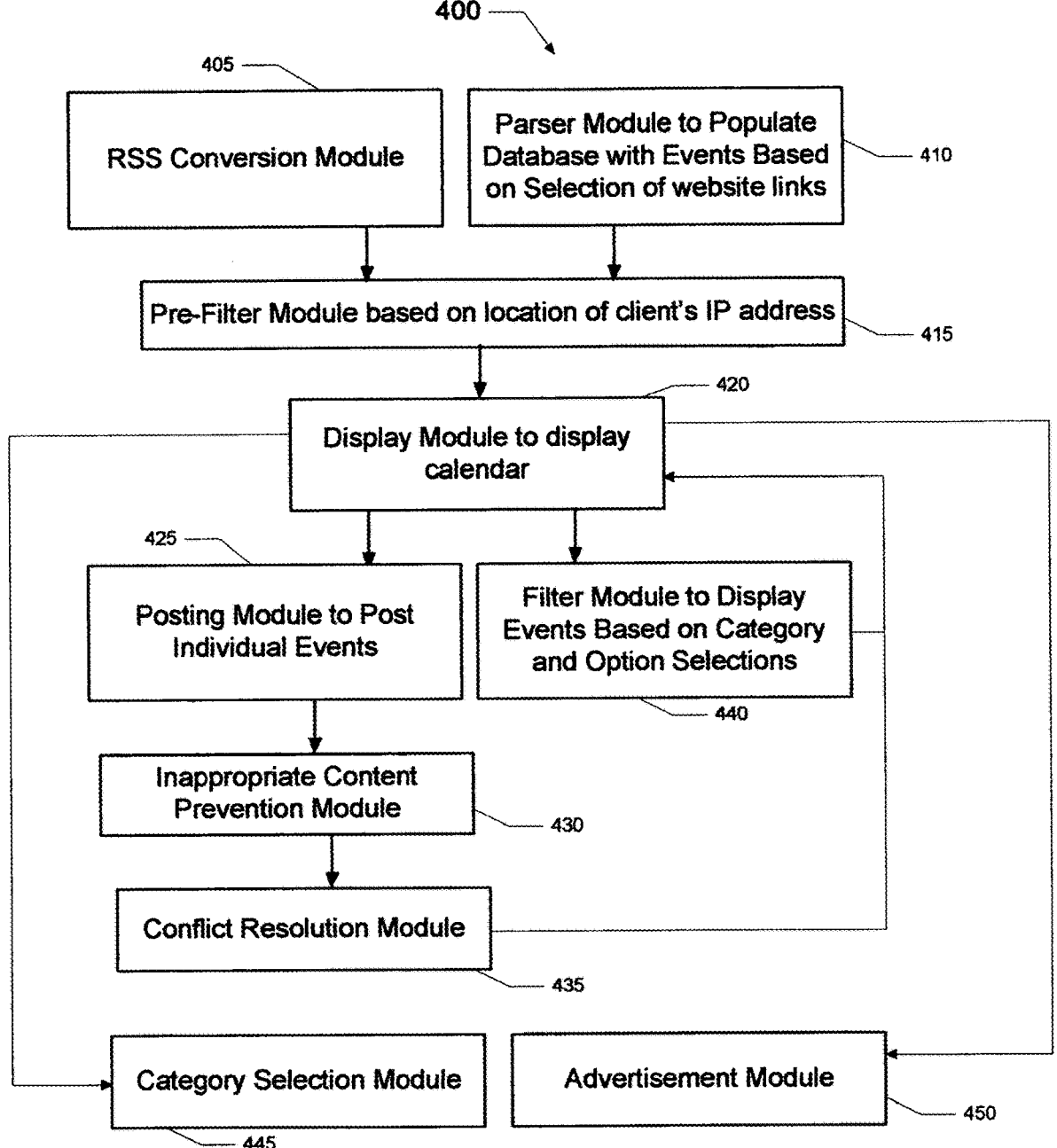
FIG. 4 illustrates a flow chart of at least one method, according to example embodiments.

FIG. 4 illustrates a flow chart of at least one method 400, according to example embodiments. At 405, an RSS Conversion module converts RSS feeds to events. At 410, a parser module converts information on websites into events and populates a database with these events. At 415, a pre-filter module, based on location of client's IP address, populates a user's calendar display with events local or regional to the user, as described herein. Events may be entered in by another user at the posting module, from the RSS conversion module, or from the parser module. At 420, the display module displays the calendar to the user. At 425, the posting module may be accessed by the user to post individual events. At 430, an inappropriate content prevention module (or fraud prevention module) scans the post for inappropriate content before allowing publication of the event. A conflict resolution module, at 435, determines whether there is a conflict in time and venue with another event on the database, and, in many cases, resolves the conflict. If there are no content issues or conflict resolution issues, the events may be displayed to the calendar display.

At 440, a filter module may be used by the user to display events based on category and option selections. The method then goes back to the display module at 420. At 445, from the display module, the method may go straight to the category selection module. At 450, from the display module, the method may go straight to the advertisement module, as described herein.

FIG. 5 illustrates a diagram 500 of advertisements related to an event, according to an example embodiment. The diagram 500 includes an event for A, B, and C, where A is, for example, preschoolers, and B is, for example, sporting events, and C is a location (e.g., city or venue). The Advertisement A 510, in this example, is directed towards parents of preschoolers in particular. The advertisement A, B 520 is, for this example, sports gear for preschoolers. The advertisement B, C 530 is, for this example, a local sporting goods store; and advertisement A 540 is, for this example, another advertisement directed towards parents of preschoolers.

Interfaces

Figure 6A:
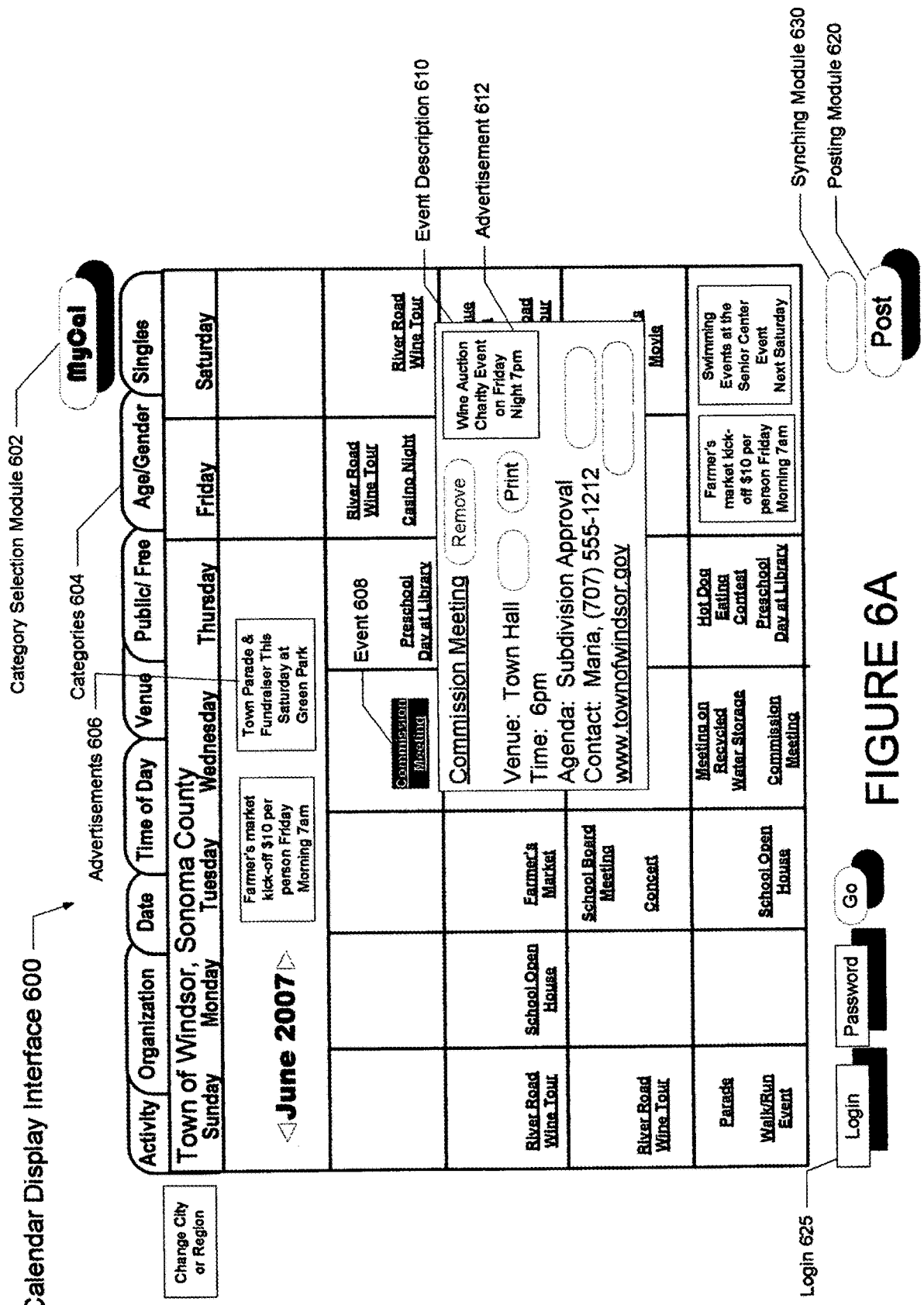
FIGS. 6A and 6B illustrates calendar display interfaces of the calendar system, according to an example embodiment.
Figure 6B:
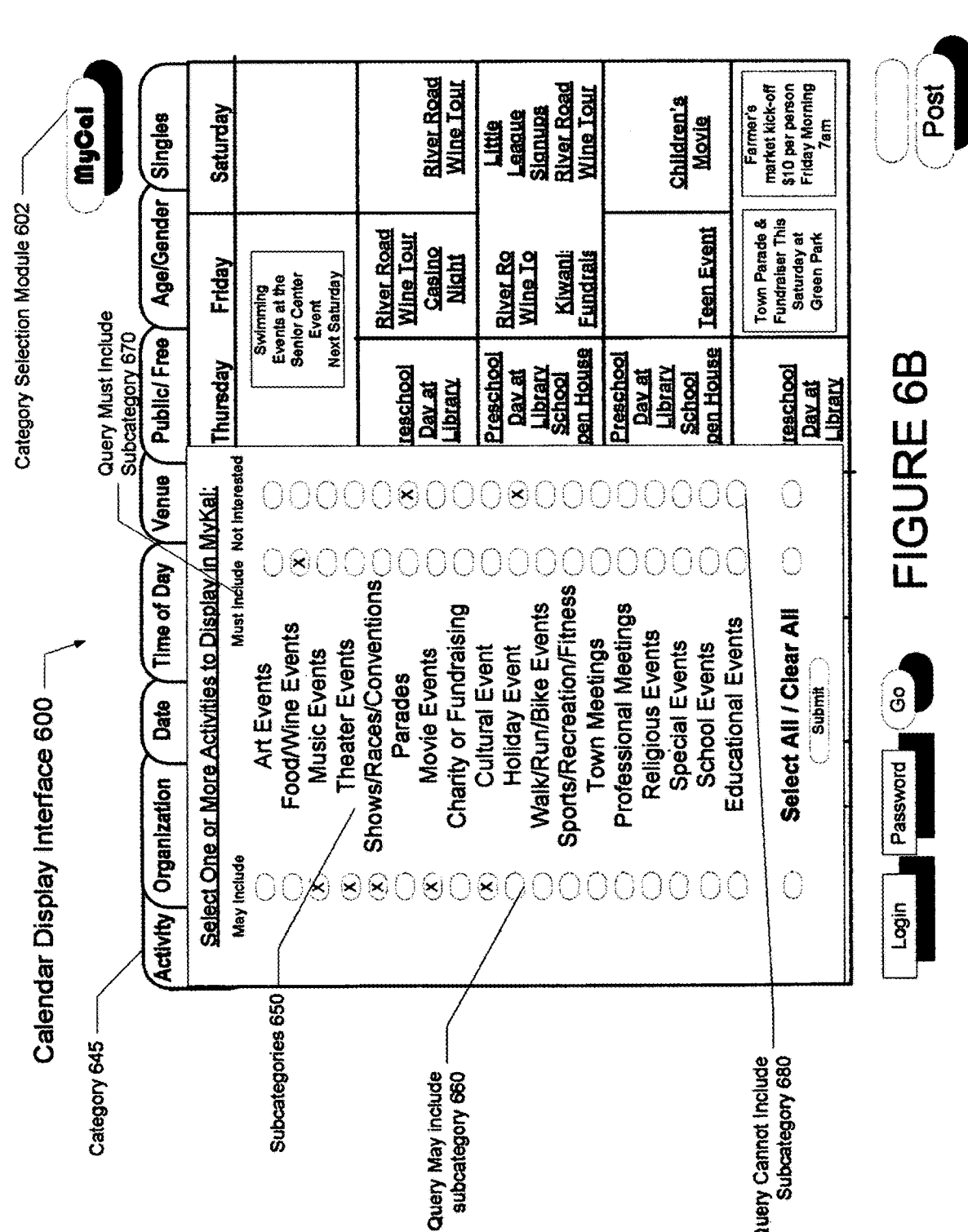

FIGS. 6A and 6B illustrates calendar display interfaces 600 of the calendar system, according to an example embodiment. The interface 600 includes a category selection module button 602, categories 604, advertisements 606, events 608 in the calendar display 600 (or interface), event description 610 in a drop down menu when an event 608 is selected, advertisement 612 pertaining to the calendar display. The interface includes a posting module button 620, a login module button 625 which includes a login name, password and a "go" or "enter" button, and a synching module button 630 to synchronize the calendar display with that of personal calendar applications, such as iCal or Microsoft® Outlook®.

In some embodiments, there are additional buttons in the display interface 600 as described below.

List of Buttons and Messages on Interface 600/Purpose of Button

| | |
|---|---|
| Mycal edit | To go to a Mycal edit page (go to FIG. 8)-hidden message example: Create an account to save a Personalized Mycal |
| Mycal view | To go to the user's default MyCal page (go to FIG. 6A with all the MyCal selections)-hidden message: view user MyCal home page as saved in user MyCal page. |

-continued

| | |
|---|---|
| Go | "Go"-to submit user's login and password. |
| Submit | 'Submit'-to submit user's search word or phrase. In addition to filtering by category, the calendar events may be filtered by specific a specific search term or phrase. In an example, the user may enter "soccer" as the search term category, rather than (or in addition to) going to subcategories under the Activity Tab. |
| CalSynch | CalSynch-go to an interface to synchronize calendar system 1 with Outlook or iCal on a PDA or on a desktop, for example. |
| Post | go to FIG. 7 to add events |
| MyAds | Go to FIG. 9 to edit and add Advertisements |
| Print | Print calendar or even |
| Map | Map to calendared event-probably a 3<sup>rd</sup> party website |
| Not interested | That event gets deleted from user's calendar view |
| Remove | To remove another user's event |
| Advertisements 612 | Takes user to the advertiser's home page in a separate window |
| Event Activity(ies) 608 | Has a 'drop down menu' associated with this tab, as discussed |

The interface 600 includes selected category 645, for instance. When selected, the category 645 opens up to display subcategories 650 and corresponding query "may include" subcategory 660, query "must include" subcategory 670, and query "cannot include" subcategory 680, In other embodiments, there may be a translation button to translate the calendar into different languages. There may be a "may include" and a "must include" selection next to each subcategory.

If "must include" is selected, the calendar must include that particular subcategory in every event entry. If "may include" is selected, the calendar may include that particular subcategory in the calendar or may not, depending on if there are events. In the example, the "may include" may be selected for "religious" and for "fitness", and for "preschoolers" and "seniors", and "may include" may be selected for "morning" and for "afternoon". Events targeted just for teens or just in the evening, for example, may not be visible on the calendar.

Instead of using words or phrases, icons may be used in the calendar display 600. The icons may be associated with tabs or buttons. Then, users do not have to speak English to use the calendar, and many more searchable icons (under the tabs) & events (icons on the main calendar page) may fit into a small space. When a user hovers over the icon, user receives an explanation of the icon and/or associated event. The icon may be found under the appropriate tab on the home page, or in the calendar main page within a particular associated date, or in the posting page. In the posting page, the user posting their event may choose all the icons that may be associated with their event in a search. When the particular icon is selected, that icon may be highlighted or circled or somehow indicated that it is selected to the user. Also on the posting page, the user may choose from the selection of icons to shorten their event title to the maximum number of allowable characters. In the calendar main page, the user may hover over the icon to get an explanation of the associated event. Under a tab on the home/main page, the user may choose one or more icons in their attempt to find events in their event search. When the particular icon is selected (under the appropriate tab), that icon may be highlighted or circled or somehow indicated that it is selected to the user.

The tabs of categories 645 may be different, and there may be multiple rows of category tabs 645. In an example, across the First Row of Tabs across the top of the calendar: Business, Personal, MyCal, MyAds; Second Row of Tabs (for both Business and Personal) across the top of the calendar: Location (to include both city and venue), Event Type, Organization, Date & Time, Public/Private (to include free and 'invite only' events), Personal Preferences (to include age, gender, family, single, etc), Search (e.g., finding a search term in the event). On the second row of tabs for MyCal specifically: Default "pre-selected" tabs that come up automatically. (the user may change the titles and content in their MyCal page) Personal MyCal default tabs (in the second row): Tab 1: Garage/Yard/Rummage Sales Tab 2: Holidays & Birthdays & Vacations Tab 3: Astronomical Events Tab 4: Regional Community Events Tab 5: My Personal Events; (the user may add more tabs or delete the tabs). For Business MyCal default tabs (in the second row): Tab 1: U.S. Economic Calendar—Tab 2: Corporation Announcements—Tab 3: Professional Meetings—Tab 4: Regional Conventions Tab 5: My Business Events. Another Filter Tab may be directed to: "FINANCE/BUSINESS" that may keep track of finance and business events for those following the stock market, for example.

A mouse over feature may be present, where user may mouse over tabs or buttons or phrases or event titles to get a message in a drop down menu. Another example, when user mouses over a calendar event, the box on FIG. 6A appears. If a meeting event is clicked once, the box may stay up there. If a meeting event is clicked twice, the website associated with the event may be loaded in a separate window.

The calendar system enables users to easily access global and/or local events though multiple filters including: Locale, Activity, Organization, Venue, Public events, Free Events, Singles Events, Garage Sales, and others. The calendar interface 600 may be viewed by month, week, date, and year.

Community contributions to the calendar may be completed in two different ways: (1) contribute calendar events having categories configured to be filtered, including age category and activity category; and (2) contribute a subCalendar to a defined list of public calendars based on a filtered search and/or based on self-added calendar events having categories configured to be filtered.

The calendar system provides an easy to use, easy to search and easy to view website. The calendar system may include events from all over the world at one central location, in an embodiment. Users may find events for free, register for free and post events for free. Multiple search filters may be used to minimize the amount of events showing up on the user's calendar to avoid overwhelming the user. The calendar system may be used in mobile applications, synchronization with current popular personal calendar applications (iCal and Microsoft® Outlook® for example), and has an ability to dynamically add events to user's personal subcalendars using personal settings and/or gathered marketing data.

Travelers and locals alike may use the calendar system to find events of certain types on certain days. In an embodiment, there may be a module to automatically locate a general location of a user who visits the website without registering so that the information loaded into the initial calendar display may pertain to the geographical region of the user. Marketing data gathered about the IP address may also be used to pre populate the calendar display of the calendar system with user-relevant events. Advertisements in the calendar may also use this marketing data. Advertisers may also choose from multiple categories to select criteria to target advertisements.

In an embodiment, a default calendar may be generated automatically and substantially uniquely for a user relevant to the user based on, for example, IP address, and any known information associated with that IP address. Further, special events local or regional to the user may be automatically displayed in the user's default calendar.

The advertisements 612 on the calendar display may be specifically targeted to the user's search and/or category filter. If the user selects marathons as an event type, for example, the corresponding advertisement in the display may be a runner's website, a local sporting goods store, or an online shoe store, for example.

The user may click on an event in their generated calendar display to find out more about the event in, for example, a pop-up window. The user may order tickets, go to the event website, make reservations, flag the event for inappropriate content, map the event, save the event to a certain subcalendar of the user, for instance. The flagged event may or may not be removed based on an algorithm. For example, a certain number of flags from a certain number of different IP addresses are specified for event removal.

Other features that FIGS. 6A and 6B may include "Clear All calendar Events" to start a new filter search, so that the events listed may not be overwhelming. The clear all and select all button(s) may be a toggle button. Filter categories by age Target Ages range may be open or pre-defined: All Ages; Infants (0-1); Toddlers (1-3) Preschool (2-5); Children (5-9); Tween (9-13); Teens (13-19); 20s; 30s; 40s; 50s; and Seniors. Filter categories may be by time of day, where the user who searches for events may have the option to select the following: Early Morning, Morning, Mid-day, Afternoon, Evening, Night, Late Night, if they wanted to filter by these criteria. Filter categories may include personal preferences, such as Singles Events or Couples Events or Family Events. There may be subcategories under an activity tab, for instance, under "sports" may be Tennis, baseball, basketball, soccer, football Or other. In addition to each of the filter tabs, users may also search for a term or phrase in the event (such as 'soccer') to pull up all events including that term. As one goes through each available category (filter) the displayed calendar is further filtered if "must" is chosen. In other words, only events that are in that category filter may be displayed. If 'not interested' is chosen, events that include that category may not be displayed. If 'may' is chosen, then the calendar includes all of those types of events, and not just when overlapping with others.

Other features may include a print button to print the calendar or event details and a map button to map the event. A drop down menu or a mini window shows up when a user mouses over an event. For example, just the title of the event would be in the calendar and mouse over or click on event to open in a "drop down" to give the rest of the event details.

In some embodiments, a text message notification of events may be received for certain event status upon selection of a text message button (not shown). For example, if a new event is added to a user's subcalendar or an event reminder has been set, text notification on a user's network based device may be received. Users may also choose what their calendar looks like (skin setting options), and what events populate it. Users and/or administrators may edit events.

The user may go through the events that appear in order to delete ones they are "Not Interested" in. After several instances of deleting certain types of events, the system may "learn" not to publish them in that user's calendar in the future. To repopulate the calendar, the user must press a back button, or clear all and start again with finding events. For example, if user has a display of senior with religious activities in the last search, the user may select those activities and select "delete." The events may be deleted from the user's calendar interface while other users may be able to see the events on their own calendar.

FIG. 7 illustrates a posting module page 700 of the calendar system, according to an example embodiment. The user may post events on an event posting page 700. The user may select a button on the calendar display to get to this posting page. The user enters information and category information associated with the event as well as contact information, for example.

The page 700 may include a "post" button 710 to post the event to the calendar when the page is completed. The page may also include event organization, event location (city, region, area), event date, event time, event venue, public or private event, free or fee, target age(s) 720 for event, target gender(s) 725, singles, couples, families, or other personal preferences.

The user who is posting the event may decide to publicly post the event by selecting public post button 730. Alternatively, the user may select "private Post" 740 and may select which of their private networks at 745 may receive the invitation to their event. A fraud prevention code 750 may be entered on the posting page to prevent automatic postings.

The calendar system may be part of a "wiki" website, which refers to a collaborative community authoring website where users contribute to and/or edit the content. Each user feels an ownership in it, and may protect the site from inappropriate postings.

Users may contribute collaboratively to the calendar system by contributing individual events by category publicly or privately and by contributing a subcalendar to a defined list of public (or private) calendars that all (or some) users may view and add to their own list of sub calendars. Private networks may be established where each user is invited to join the group to limit who may view certain events.

The user may receive a confirmation email before the event is posted. The user may post a subcalendar to a public or private list of subcalendars as discussed in more detail with regard to FIG. 8. In an embodiment, it is possible to add multiple events using a certain format, e.g., a spreadsheet, or iCal format, for instance.

Figure 8:
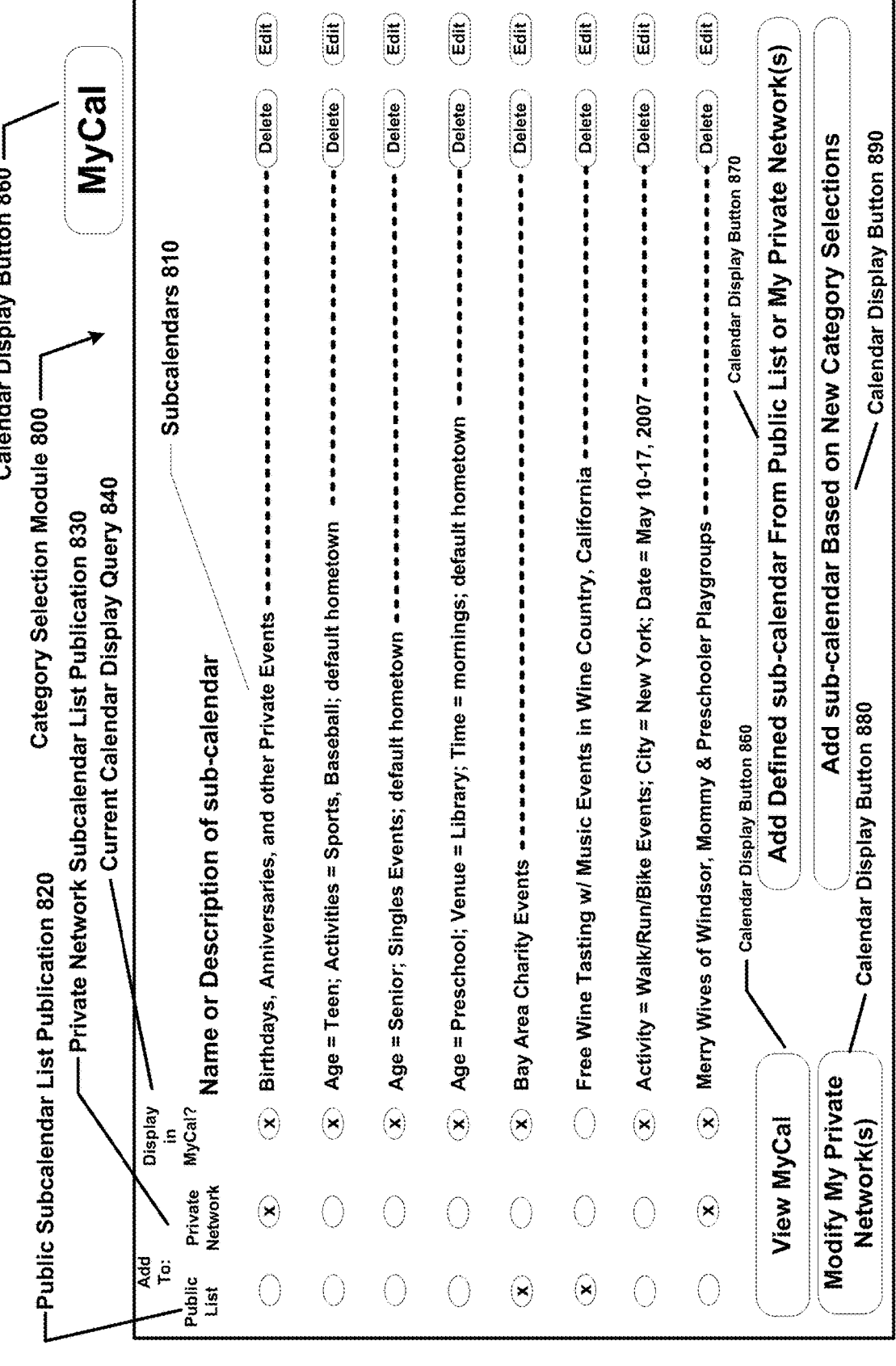
FIG. 8 illustrates a category selection module page of the calendar system, according to an example embodiment.

FIG. 8 illustrates a category selection module page 800 of the calendar system, according to an example embodiment. The page 800 lists one or more subcalendars 810 on a user's home page. Personalized filtered searches (also known as subCalendars) may be saved in a personal MyCal. MyCal may include multiple independent subCalendars. For each subcalendar the user may choose a name, the filters the subcalendar uses and whether they want to make the subcalendar public (publicly available) at 820, private (private network) at 830 or displayed just in the user's personal calendar (default). At buttons 840, the user can decide whether that particular subcalendar is turned on or off in a main personal user calendar accessed through button 860.

The list of publicly available subcalendars may be found at button 870, and any of the subcalendars found in the list may be added to the user's list of subcalendars and turned on or off in their main calendar screen as the user desires. The user may also modify their private networks and add 'friends' to invite them to events or subcalendars of events at button 880. In addition, the user may also add a subcalendar based on new category selections at button 890.

The user may search through a list of public calendars created by other users or may search through a list of private calendars for events that the user has specifically been invited to or clubs the user is a part of, for instance.

The user may delete or edit each subcalendar. If the user edits the subcalendar, the user may change the subcalendar title name to reflect the change. The change may be in filtered categories (for example, the age range may be broadened from targeting children to targeting all ages).

There may be cookies left on a user's computer to automatically recognize the user and display the chosen subcalendars upon loading up the main calendar page. Like Wild sites, users of this Calendar may not be required to register in order to view public events. However, the Calendar need not be blank when a user visits the calendar system website. The website may dynamically generate a default calendar for a user through filtering by the area that the user lives in, and by special local events and/or known user interests (based on IP address, for example).

The user may save certain searches in their calendar "MyCalendar" or "MyCal". Or have several different calendars that they have saved for each city they visit, for instance. Each of their calendars may have a different name. As one goes through each available category (filter) it further defines or filters the displayed calendar, if "must" is chosen. If 'not interested' is chosen, events that include that category may not be displayed. MyCal subcalendars may include subCalendars from a public/private list and subCalendars based on personal category selections. In an example, subCalendars may be for personal use only (ex: birthday events), may be shared on a public list, or shared with a private network of selected users. Events may be dynamically added to a user's MyCal. When the added event fits within the filtered criteria in one of the user's specific subCalendars, as shown above, the event is added to user's MyCal.

SubCalendars may be placed in a private network accessible for selected others. A private network limits dissemination of certain sensitive information (e.g., venue or time or other info) to members only. Private Network may be established to provide certain information (e.g., venue=user home address) to members only, for safety reasons (e.g., girls scouts meeting, Mom's Club, or book club). As for "private events", the posting person has to give some contact information. When a non-member clicks on an event to find out the details, they discover that they need to become a member of the group first. There are instructions on how to join or who to contact to find out more. The members may also be invited to the private network by another user. The private events may just appear as "private" on the calendar so that when booking events (e.g., Weddings at Angel's Gate Park) the user may see which dates are available and which dates are already taken, and not any event details.

Figure 9:
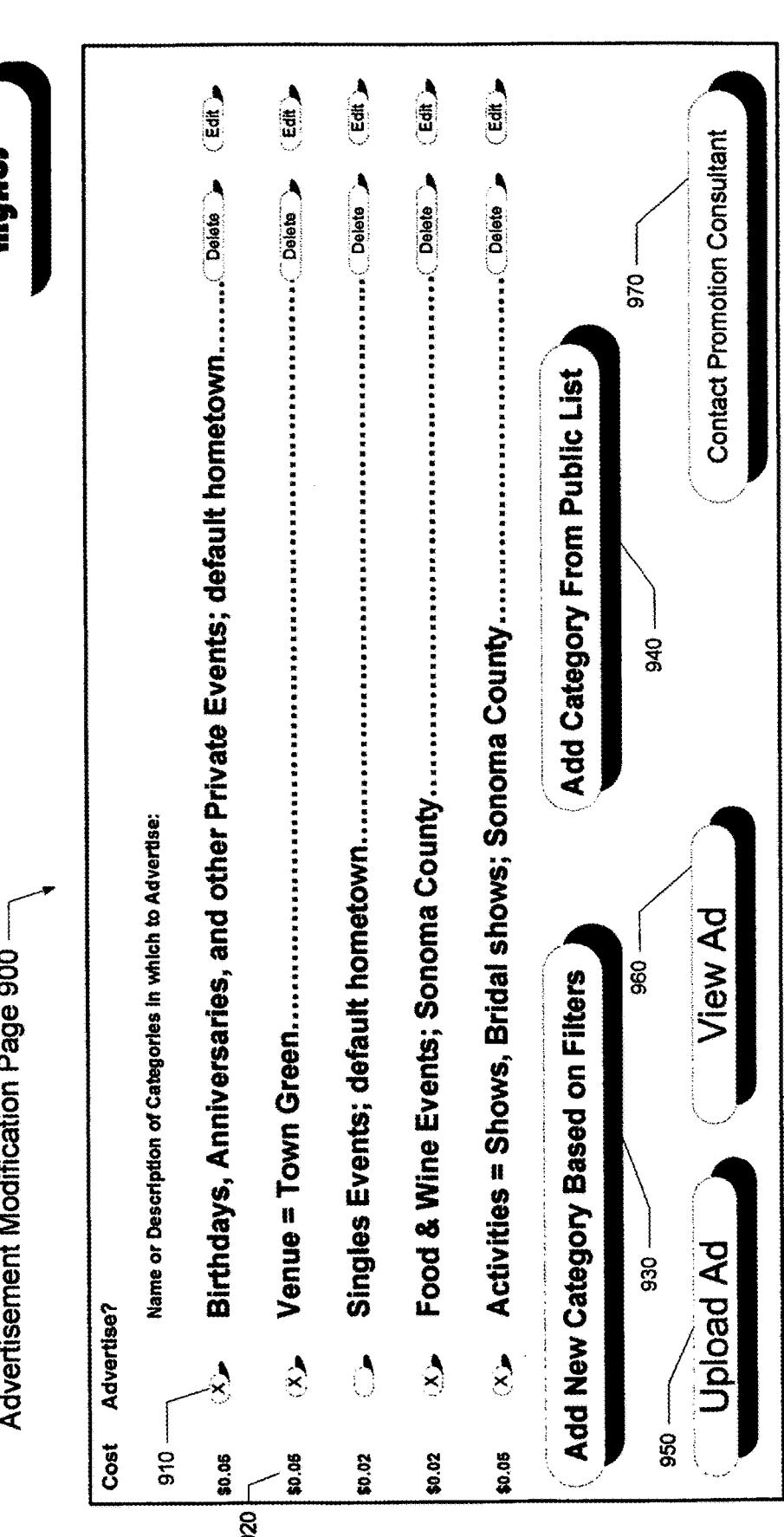
FIG. 9 illustrates a marketing module page of the calendar system, according to an example embodiment.

FIG. 9 illustrates a marketing module page 900 of the calendar system, according to an example embodiment. The page 900 may include a list of subcalendars, each with an ability to delete, edit, advertise (turn on or off) 910 and a cost 920 involved with publication of each subcalendars. These subcalendars may be ones that are found from a public list (button 940), and/or may be added based on filters (button 930)—ones specifically targeted to certain groups, the advertiser may decide which. There may be a page 900 for each advertisement. In the sample page 900, the advertisement is for the Town Green Bar & Grill advertisement. A new advertisement may be uploaded upon selection of button 950. The advertisement may be viewed upon selection of button 960. A promotion consultant may also be contacted to tailor the advertisement or the target audience at button 970.

MyAds allows an advertiser to specifically select to whom they want to advertise based on filters. Advertisements may appear in a user's calendar based on user's interests and/or filters used.

In an embodiment, the marketing module 134 requests display of a particular advertisement in the calendar display interface, wherein the particular advertisement is filtered from an advertisement database based on selection of a second collection from the plurality of categories, wherein in a first mode the second collection is included within the first collection and both the at least one filtered event and the particular advertisement are displayed in the calendar interface. In a further embodiment, a compare module 136 compares the first collection of the plurality of categories to the second collection of the plurality of categories to determine whether the second collection is included within the first collection.

Promoters may add their events for free to the general calendar, and may have an option in the posting page to promote their event in an advertisement on the general calendar under selected categories.

Events on the calendar system may be viewed on a mobile platform. If a user is traveling to a different locale than usual, the network-based device may automatically populate the calendar with events in that new locale, and/or the user may pre-select certain dates in that locale based on selected filtered categories to know what is going on in their upcoming destination for planning purposes.

Computer System

Figure 10:
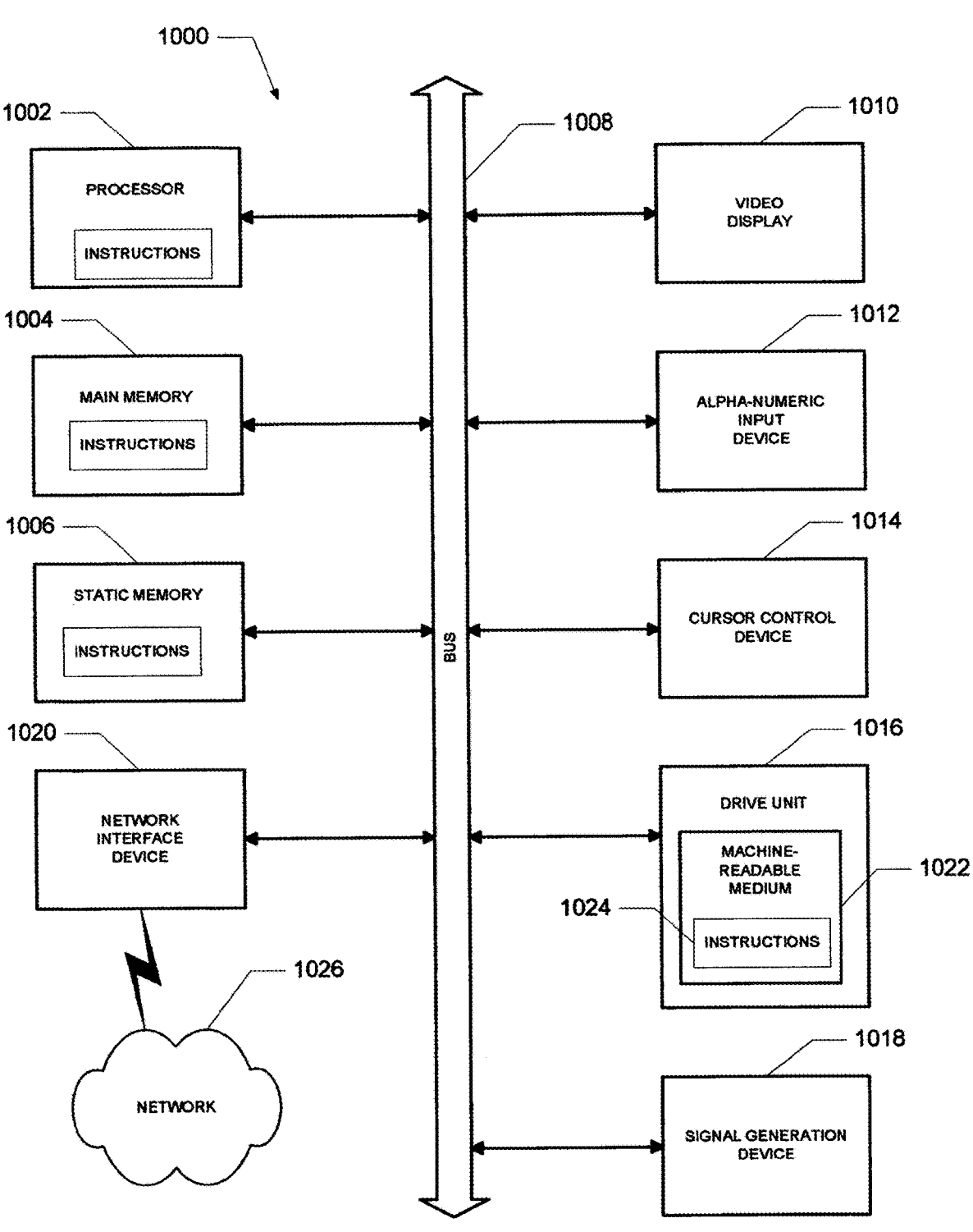
FIG. 10 illustrates a diagrammatic representation of a machine in the form of a computer system within which a set of instructions, for causing the machine to perform any one or more of the methodologies discussed herein, may be executed, according to an example embodiment.

FIG. 10 shows a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., network) to other machines. In a network deployment, the machine may operate in the capacity of a server or a client user machine in server-client user network environment, or as a peer machine in a peer-to-peer (or distributed) network environment. The machine may be a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a television, television cable a pager, a personal trusted device, a web appliance, a network router, switch or bridge, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

The instructions 1024 may further be transmitted or received over a network 1026 via the network interface device 1020.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It may be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, or optical and magnetic media.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments may be apparent to those of skill in the art upon reviewing the description herein. Other embodiments may be utilized and derived therefrom, such that structural and logical substitutions and changes may be made without departing from the scope of this disclosure. FIGS. 1 to 9 are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. § 1.74(b) to allow the reader to quickly ascertain the nature and gist of the technical disclosure. The Abstract is submitted with the understanding that it may not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, embodiments describe a calendar method and a system. Although embodiments have been described with reference to specific examples, it may be evident that various modifications and changes may be made to these examples without departing from the broader spirit and scope of embodiments described herein.

The invention claimed is:

1. A mobile device system comprising one or more processors coupled with a non-transitory computer-readable storage medium, the non-transitory computer-readable storage medium having instructions configured to execute on the one or more processors, the system comprising:

a database module coupled with a network, wherein the database module is configured to store:

a client IP address associated with a mobile device, known information associated with the IP address, wherein the known information is configured to comprise one or more locations associated with the IP address, and content configured to be displayed on the mobile device, wherein the content configured to be displayed on the mobile device includes a plurality of events, wherein each event comprises a date, a time, and an associated location, a location module coupled with the network and configured to dynamically update a current location of the mobile device in a mobile phone network, wherein the dynamic update of the current location of the mobile device comprises recognition of the IP address associated with the mobile device in the mobile phone network;

a selection module coupled with the database module, the selection module configured to:

determine one or more certain content types associated with the content configured to be displayed on the mobile device, wherein the determination of the one or more certain content types is based on several instances of user selections associated with the content configured to be displayed on the mobile device;

a filter module coupled with the database module and configured to:

manage the content configured to be displayed on the mobile device, and dynamically filter the content configured to be displayed on the mobile device based on:

the recognized IP address associated with the mobile device without the need to be registered to be recognized, the known information associated with the recognized IP address, the dynamically updated current location of the mobile device in the mobile phone network, wherein a subset of the plurality of events with an associated location nearby the dynamically updated current location are included in the dynamically filtered content, and the one or more certain content types associated with the selection module;

a notification module coupled with the mobile phone network, the notification module configured to automatically populate and display updated content on the mobile device, wherein the updated content comprises the dynamically filtered content; and an advertising module coupled to the database module, the advertising module configured to automatically populate and display one or more advertisements related to the subset of events included in the dynamically filtered content on the mobile device.

2. The system of claim 1 wherein the one or more certain content types is further based on several instances of deletion selections of the content types configured to be displayed on the mobile device.

3. The system of claim 1 wherein the one or more certain content types is further based on several instances of no-interest selections of the content configured to be displayed on the mobile device.

4. The system of claim 1 wherein the known information is configured to further comprise one or more of the following: content type searches, and the one or more certain content types determined by the selection module.

5. The system of claim 4 further comprising a cookie module, wherein the cookie module is configured to recognize a cookie saved on the mobile device, wherein account information associated with the mobile device is associated with the cookie.

6. The system of claim 1 wherein when an account associated with the mobile device is not logged in, the notification module is configured to dynamically display the updated content on the mobile device.

7. The system of claim 1 wherein the location module is configured to use one or more of Radio Frequency identification (RFID) and near field communication.

8. The system of claim 1 further comprising an icon module, wherein the icon module is configured to replace one or more words within the content with an icon associated with the one or more words.

9. The system of claim 1 wherein the database module is further configured to store another IP address associated with a network device, wherein the network device is associated with one or more of the following:

the one or more of the content searches and the content selections, the account information associated with the mobile device, account information associated with the network device, known information associated with the other IP address, one or more locations associated with the other IP address, the one or more locations associated with the IP address, the content configured to be displayed on the mobile device;

the one or more certain content types, the several instances of selections, several instances of deletion selections of the content configured to be displayed on the mobile device, several instances of no-interest selections of the content configured to be displayed on the mobile device, a cookie saved on the mobile device, and a cookie saved on the network device.

10. The system of claim 1 wherein the known information is further configured to comprise account information associated with the mobile device.

* * * * *